US012566340B2

(12) United States Patent
Dubail

(10) Patent No.: US 12,566,340 B2
(45) Date of Patent: Mar. 3, 2026

(54) ARTICLE HAVING FILTERS SELECTED TO HAVE METAMERIC TRANSMISSION SPECTRA AND A METHOD FOR DETERMINING SAID FILTERS

(71) Applicant: Essilor International, Charenton-le-pont (FR)

(72) Inventor: Marie Dubail, Saint Maurice (FR)

(73) Assignee: Essilor International, Charenton-le-pont (FR)

( * ) Notice: Subject to any disclaimer, the term of this patent is extended or adjusted under 35 U.S.C. 154(b) by 498 days.

(21) Appl. No.: 18/013,725

(22) PCT Filed: Jun. 29, 2021

(86) PCT No.: PCT/EP2021/067837
§ 371 (c)(1),
(2) Date: Dec. 29, 2022

(87) PCT Pub. No.: WO2022/002930
PCT Pub. Date: Jan. 6, 2022

(65) Prior Publication Data
US 2023/0280602 A1     Sep. 7, 2023

(30) Foreign Application Priority Data
Jun. 30, 2020     (EP) .................................... 20305727

(51) Int. Cl.
*G02C 7/10*          (2006.01)
*G02C 7/02*          (2006.01)

(52) U.S. Cl.
CPC ............. *G02C 7/104* (2013.01); *G02C 7/027* (2013.01); *G02C 7/102* (2013.01); *G02C 7/105* (2013.01);
(Continued)

(58) Field of Classification Search
CPC ........ G02C 7/104; G02C 7/027; G02C 7/102; G02C 7/105; G02C 2202/06; G02C 2202/10; G02C 2202/24
See application file for complete search history.

(56) References Cited

U.S. PATENT DOCUMENTS 5,218,386 A       6/1993   Levien
2017/0264889 A1   9/2017   Wang
(Continued)

OTHER PUBLICATIONS

European Search Report in corresponding European Application No. 20305727.8, dated Dec. 10, 2020.
(Continued)

*Primary Examiner* — Tuyen Tra
(74) *Attorney, Agent, or Firm* — Norton Rose Fulbright US LLP

(57)          ABSTRACT

The invention provides a method for determining a first filter intended to be placed in front of an eye of a wearer and a second filter, different from the first filter, intended to be placed in front of an eye of a wearer, the method comprising the following steps: —providing a first transmission spectrum; —determining metameric transmission spectra of said first transmission spectrum; —determining said first filter based on said first transmission spectrum or based on a first metameric transmission spectrum selected from the metameric transmission spectra; and —determining said second filter based on a second metameric transmission spectrum selected from the metameric transmission spectra.

14 Claims, 5 Drawing Sheets

(52) U.S. Cl.
CPC ..... *G02C 2202/06* (2013.01); *G02C 2202/10* (2013.01)

(56) References Cited

U.S. PATENT DOCUMENTS

| 2018/0041737 A1 | 2/2018 | Kats et al. |
| 2019/0258087 A1 | 8/2019 | Valentine |
| 2019/0258187 A1 | 8/2019 | Kashiwakura |
| 2020/0012125 A1 | 1/2020 | Chalberg, Jr. et al. |

OTHER PUBLICATIONS

International Search Report in corresponding PCT Application No. PCT/EP2021/067837, mailed Oct. 11, 2021.

Fig. 3

| | Reference | Metameric 1 | Relative Difference 1/ Reference | Metameric 2 | Relative Difference 2/ Reference |
|---|---|---|---|---|---|
| L*2° | 44,6 | 45,7 | -0,02 | 43,9 | 0,02 |
| a*2° | 4,9 | 5,5 | -0,11 | 10,5 | -1,13 |
| b*2° | 13,8 | 12,6 | 0,09 | 11,6 | 0,16 |
| L*10° | 44,6 | 45,8 | -0,03 | 44,5 | 0,00 |
| a*10° | 2,5 | 2,7 | -0,05 | 2,8 | -0,11 |
| b*10° | 15,5 | 14,4 | 0,07 | 15,4 | 0,01 |
| x D65 10° | 0,4 | 0,4 | 0,01 | 0,4 | 0,00 |
| y D65 10° | 0,4 | 0,4 | 0,01 | 0,4 | 0,00 |
| z D65 10° | 0,3 | 0,3 | -0,03 | 0,3 | 0,00 |
| x D65 2° | 0,4 | 0,4 | 0,01 | 0,4 | -0,02 |
| y D65 2° | 0,4 | 0,4 | 0,01 | 0,4 | 0,04 |
| z D65 2° | 0,3 | 0,3 | -0,03 | 0,3 | -0,03 |
| X2° | 151784 | 160370 | -0,06 | 156130 | -0,03 |
| Y2° | 150988 | 158754 | -0,05 | 145747 | 0,03 |
| Z2° | 107529 | 118523 | -0,10 | 111121 | -0,03 |
| X10° | 162072 | 171546 | -0,06 | 161392 | 0,00 |
| Y10° | 166085 | 175635 | -0,06 | 164858 | 0,01 |
| Z10° | 110090 | 121743 | -0,11 | 109547 | 0,00 |
| $\Delta$E*ab(2°) / Ref | | 1,7 | | 6,0 | |
| $\Delta$E*ab(10°) / Ref | | 1,6 | | 0,3 | |

Transmittance (%)

ARTICLE HAVING FILTERS SELECTED TO HAVE METAMERIC TRANSMISSION SPECTRA AND A METHOD FOR DETERMINING SAID FILTERS

CROSS-REFERENCE TO RELATED APPLICATIONS

This application is a national phase application under 35 U.S.C. § 371 of International Application No. PCT/EP2021/067837 filed 29 Jun. 2021, which claims priority to European Patent Application No. 20305727.8 filed 30 Jun. 2020. The entire contents of each of the above-referenced disclosures is specifically incorporated by reference herein without disclaimer.

FIELD OF THE INVENTION

The present invention relates to the manufacturing of visual equipments, for example ophthalmic lenses.

More particularly, the invention relates to a method for determining first and second filters intended to be placed in front of the eye of a user.

BACKGROUND OF THE INVENTION

It is common to design filters with specific spectral transmission to prevent damages from harmful light, to prevent from glare or to increase color vision. For instance, these specific spectral transmissions allow to distort color vision or reduce circadian light to achieve the above goals.

These specific spectral transmissions may however impair visual perception of the environment, particularly color vision, and can be bothersome for the wearer of these filters. Furthermore, the color appearance of a lens or of lenses of a same visual equipment may not be uniform due to the different spectral transmissions.

Therefore, filters with specific spectral transmission require a trade-off between benefits and disadvantages. Depending on the wearer, a satisfactory balance may be very difficult to obtain. Indeed, specific spectral transmission of lenses may impair color vision, producing color confusions or decreasing color discrimination. For instance, specific lenses designed to improve color vision of colorblind wearers may increase green/red contrasts but decrease green and yellow ones and darken the green colors.

Thus, there is a need for designing filters that do not have the above drawbacks. Particularly, there is a need for filters with specific spectral transmission without impairing visual perception of the wearer, particularly color vision, and color appearance of the filters.

SUMMARY OF THE INVENTION

To that end, the invention provides a method for determining a first filter intended to be placed in front of an eye of a wearer and a second filter, different from the first filter, intended to be placed in front of an eye of a wearer, said first and second filters being intended to be positioned in a non-superposed configuration, the method comprising the following steps:

provided a first transmission spectrum;

determining metameric transmission spectra of said first transmission spectrum;

determining said first filter based on said first transmission spectrum or based on a first metameric transmission spectrum selected from the metameric transmission spectra of said first transmission spectrum; and determining said second filter based on a second metameric transmission spectrum selected from the metameric transmission spectra of said first transmission spectrum, wherein said first transmission spectrum and said metameric transmission spectra of said first transmission spectrum have a transmission greater than 0% between 450 and 650 nm.

By providing filters with metameric transmission spectra, the method allows to obtain complementary filters that are configured to prevent color impairment induced by a specific transmission spectrum.

As mentioned above, said first transmission spectrum or first metameric transmission spectrum may be first determined to prevent damages from harmful light, to prevent from glare or to increase color vision. However, this first transmission spectrum or first metameric transmission spectrum may in the meantime impair visual perception of the environment. Determining a second transmission spectrum which is a metamer of said first transmission spectrum or said first metameric transmission spectrum allows to reduce or prevent this impairment.

Metamerism is usually considered as a defect or a negative side effect of color vision. Indeed, it produces different colors stimulation for a single object seen under different lightnings (dyes, pigment, ink, paint . . . ). It is the result of the combination of the reflectance (or transmittance) spectrum, the emission spectrum of the light source and the spectral sensitivity of the cones (photoreceptors producing color vision stimuli). Hence, two different combinations may create two different cone stimulations or on the contrary the same stimulation of the photoreceptors. Therefore, two different spectra of two distinct objects may be seen identically under a specific light source and differently under a second one.

Providing these metameric filters in a visual equipment worn by a user allows him to experience improved color vision. For instance, it allows to produce increased colored contrasts on one area of a lens and to preserve original contrast on another area. Different wavelengths on different areas or different time may be provided with a uniform and aesthetic appearance. It is now possible for the user to choose the desired color rendering or desired feature of the lens.

Providing said first and second filters as obtained in the invention allows to provide an improved color homogeneity of the filters themselves as perceived by external users or by the wearer.

By "a non-superposed configuration", we mean that said first and second filters are intended to be positioned next to each other on a same surface or on two different surfaces. In other words, a given light ray cannot travel through both first and second filters.

Said first transmission spectrum and said metameric transmission spectra of said first transmission spectrum have a transmission greater than 0% between 450 and 650 nm. In other words, said first and second filters have a transmission greater than 0% between 450 and 650 nm. It also means that said first and second filters provides a continuous transmission spectrum which does not have transmission peaks leading the transmission to drop to 0% for one or more wavelength ranges between 450 and 650 nm. It allows to maximize light entrance into the user's eye and eye stimulation on a large wavelength range.

According to an embodiment of the determining method, the step of determining said metameric transmission spectra comprises the steps of:

determining the chromatic coordinates of the first transmission spectrum in a color space; and determining transmission spectra different from the first transmission spectrum having substantially the same chromatic coordinates in the same color space.

According to an embodiment of the determining method, the color space takes into account the human visual system.

According to an embodiment of the determining method, the first filter is intended to be placed in front of a first eye of the wearer and the second filter is intended to be placed in front of a second eye of the wearer, different from the first eye.

According to an embodiment of the determining method, the first filter is intended to be placed at a first area in front of an eye of the wearer and the second filter is intended to be placed at a second area in front of said eye, said first area being different from said second area.

According to an embodiment of the determining method, the step of determining said second filter comprises:

determining a color of a portion of the skin of the wearer, selecting the second metameric transmission spectrum such that said color of a portion of the skin of the wearer through the second metameric transmission spectrum is substantially the same as the color of the skin of the wearer through:

the first metameric transmission spectrum when said first filter is based on said first metameric transmission spectrum or through the first transmission spectrum when said first filter is based on said first transmission spectrum.

According to an embodiment of the determining method, the step of determining said second filter comprises:

determining a color of an iris of the wearer, selecting the second metameric transmission spectrum such that said color of the iris of the wearer through the second metameric transmission spectrum is substantially the same as the color of the iris of the wearer through:

the first metameric transmission spectrum when said first filter is based on said first metameric transmission spectrum or through the first transmission spectrum when said first filter is based on said first transmission spectrum.

The invention further provides an article comprising at least one ophthalmic lens intended to be placed in front of at least one eye of a wearer, said article further comprising a first filter and a second filter determined according to the determining method above.

According to an embodiment of the article, said at least one ophthalmic lens comprises said first and said second filters respectively provided to a first and to a second portions of said at least one ophthalmic lens.

According to an embodiment of the article, said first and said second filters provides a linear or concentric gradient of spectral transmission.

According to an embodiment of the article, said at least one ophthalmic lens comprises said first and said second filters, said at least one ophthalmic lens being configured to activate either said first or said second filter.

According to an embodiment of the article, it further comprises a first ophthalmic lens having said first filter and a second ophthalmic lens having said second filter.

The invention further provides a use of the article as described above for improving color vision for a wearer.

The invention further provides a use of the article as described above for a colorblind wearer.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIGS. 2 and 3 are respectively a graph and a table illustrating an example of results obtained with the determining step of the method.

DETAILED DESCRIPTION OF EMBODIMENTS

Figure 1:
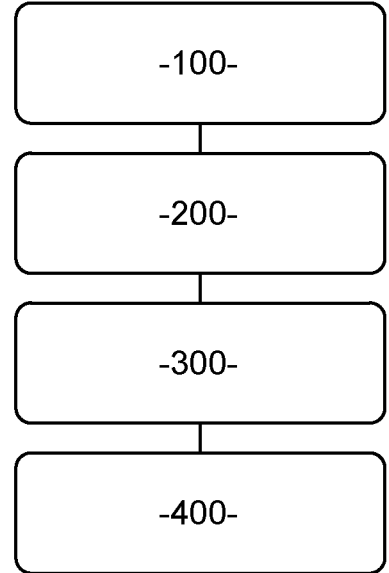
FIG. 1 is a flowchart detailing a method for determining metameric first and second filters.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements but is not limited to possessing only those one or more steps or elements.

The method allows to determine a first filter intended to be placed in front of an eye of a wearer and a second filter, different from the first filter, intended to be placed in front of an eye of a wearer. Said first and second filters may be part of a visual equipment intended to be placed in front of the eyes of a user. Said first and second filters may be placed in front of two different eyes of a same wearer or in front of a same eye of said wearer.

The visual equipment may be an ophthalmic lens or pair of ophthalmic lenses, possibly active lenses, or a solar lens or pair of solar lenses, or an ophthalmic solar lens or pair of ophthalmic solar lenses. It may be in the form of glasses or contact lenses or intra-ocular lenses. For example, it may be a pair of progressive lenses. The solar lens may be of any class among 0, 1, 2, 3 or 4.

The aim of the invention is to design a visual equipment with more than one spectral transmission. Particularly, said visual equipment has spectral transmissions which are metameric. Hence, said visual equipment comprises first and second metameric filters. In a more general way, said visual equipment comprises a plurality of metameric filters having different spectral transmissions. In other words, these spectral transmissions have different wavelengths but similar chromatic coordinates. Practically speaking, this means that two lenses having different spectral transmissions have similar color appearance. In the same way, a single lens having areas with different spectral transmissions has a uniform color appearance.

It is therefore possible to have a plurality of filters or a plurality of portions of a same filter with similar color appearance (e.g. green, grey or brown) but providing different color perception.

This metameric configuration can be distributed as a binocular, a geometrical or a temporal configuration, or a combination thereof.

In the binocular configuration, two different filters are determined for left and right eyes. In this configuration, a first filter is intended to be placed in front of a first eye of the wearer and a second filter is intended to be placed in front of a second eye of the wearer, different from the first eye.

Right and left (or first and second) filters are metameric with each other in this configuration. The colors of both right and left filters appear identical, particularly outdoor under specific light source, preferably daylight sources, but the spectral transmission of both filters is different and produce different color perception.

If one of these lenses produces color confusion, the second one will avoid this effect. Hence, binocular summation is used to obtain the benefits from both lenses. Furthermore, a personalized version can be proposed to fit the eye dominance. If the color differences are considered as binocular disparities, it may induce a better depth perception, according to the level and amount of color differences.

Besides, binocular contrast sensitivity is higher than monocular contrast sensitivity and binocular disparities may bring higher depth perception. Binocular summation of chromatic contrast is detailed in "The Binocular Combination of Chromatic Contrast", by Simmons David R, 2005. and "On the binocular summation of chromatic contrast", Simmons et al. 1998.

In the geometrical configuration, a filter is designed with different filter areas having different spectral transmissions but similar color appearance. For instance, it allows the wearer to choose the color vision (or specific feature) that best suits its task depending on the filter area observed. These filter areas may have a gradient of spectral transmission (linear or concentric). The determination of the spectral transmission of the filter areas may take into account the linear difference of color temperature of the environment to produce a better color vision, from the sky to the ground.

In this geometrical configuration, a first filter may be intended to be placed at a first area in front of an eye of the wearer and a second filter is intended to be placed at a second area in front of said eye, said first area being different from said second area.

In the temporal configuration, metameric filters may be selectively activated to allow the wearer to observe either one or the other of the filters. Hence, the wearer can choose the desired color vision according to the environment (or different specific feature such as glare protection, blue light protection or circadian regulation, automatically according to the time of the day). The color change is thus invisible for the others because the two filters have similar color appearance.

In a preferred embodiment of the temporal configuration, the lenses are electrochromic lenses.

The visual equipment or article with metameric filters is suitable for every age category, for normal observers and for colorblind wearers. This article allows to avoid color confusions of specific lenses and provides a new color vision experience without being noticed by others.

A personalized visual equipment taking into account dominant eye and binocular behavior of the wearer may be provided. Furthermore, it allows to manufacture lenses suitable for driving even with important selective filtration (if >Cat 3.). It also allows to manufacture lenses with a specific defocus on the retina for myopia control with a uniform color appearance.

This article or visual equipment may thus be used for improving color vision for a wearer or for a colorblind wearer.

The method for determining the first and second filters which a metameric with each other is described below.

In reference to FIG. 1, a first transmission spectrum is first provided 100.

This first transmission spectrum is for example determined to prevent damages from harmful light, to prevent from glare or to increase color vision. For instance, this first transmission spectrum may create a lot of color distortion, or provide a specific filtration for a given activity.

This first transmission spectrum may be defined by chromatic coordinates in a color space. This color space may be CIE-XYZ space, CIEL*a*b space, XYZ space, a L*a*b* space or a LMS space. In a general manner, said color space can be any color space that takes into account the human visual system. Standard observer used to define the human visual system may be at an angle of 2° or 10°. This first transmission spectrum may have any spectral transmission, i.e. between 380 and 780 nm.

The first spectral transmission is preferably determined directly through all the layers of a lens. Hence, hard-coat layer, antireflective layer or mirror layer or any layer of the lens are considered when determining the first transmission spectrum.

Metameric transmission spectra of said first transmission spectrum are then determined 200.

Chromatic coordinates of the first transmission spectrum are determined in a predetermined color space. For example, these chromatic coordinates can be as follows in a X, Y, Z space:

$$X_{TS1}, Y_{TS1} \text{ and } Z_{TS1}$$

Transmission spectra are then determined to be different from the first transmission spectrum but having substantially the same chromatic coordinates in the same color space. In other words, a plurality of transmission spectra are determined to have similar chromatic coordinates in the same color space as the first transmission spectrum but with a different transmission spectrum.

In this determination step 200, a metameric spectral curve is calculated based on the spectral sensitivity of the photoreceptors or within a colorimetric space, according to an illuminant. Said illuminant is preferably D65 but may vary depending on the use of the filters. It is also possible to choose a specific light source instead of a standard illuminant. Several possibilities of spectral curves may be possible.

The best curve is then identified within the calculated choices according to one or more of the following constraints: manufacturing process, dyes, pigments, wearer physiological characteristics (age, etc.), wearer preferences, wearer light sensitivity, color distortion.

As an example, the following constraints may be provided to determine the metameric transmission spectra:

Number and nature of dyes available in a specific manufacturing process

Melanopsin excitation: minimum or maximum

Specific spectral transmission over a given spectral band (for instance: minimal spectral transmission for "bad blue light")

$\Delta E^*ab<2$ between 2 different spectra seen under D65 illuminant.

The color of the skin or of the iris.

$\Delta E$ is called color difference in:

$$\Delta E^*ab=\sqrt{(L1^*-L2^*)^2+(a1^*-a2^*)^2+(b1^*-b2^*)^2}$$

$\Delta E$ and $\Delta E^*$ are different notation both referring to a same feature, i.e. color difference. Particularly, they are generic notation for color difference defined by CIE. Other formula of $\Delta E$ than the above-mentioned formula can be used, such as $\Delta E94$ or $\Delta E2000$.

The calculation of the metameric spectral curve and the identification of the best curve may be performed one after the other or at the same time, as the constraints may be mathematically included in the calculation.

From the visible range of the spectrum, chromatic coordinates X, Y, Z and x, y of the target spectrum can be determined in a CIE-XYZ color space. To calculate chromatic coordinates, color matching functions: $\bar{x}$, $\bar{y}$, $\bar{z}$ are applied to the spectrum. These color matching functions were defined for a specific visual field, more specifically for 2° or 10°. Preferably, a standard observer 10° is here used.

The following equation is then solved:

$$X\text{metamer}=XTS1+\varepsilon$$

$$Y\text{metamer}=YTS1+\varepsilon$$

$$Z\text{metamer}=ZTS1+\varepsilon$$

or $$x\text{metamer}=xTS1+\varepsilon$$

$$y\text{metamer}=yTS1+\varepsilon$$

where (a)

$$X = k * \int_{380}^{780} T(\lambda)*I(\lambda)*\bar{x}(\lambda).\ d\lambda$$

$$Y = k * \int_{380}^{780} T(\lambda)*I(\lambda)*\bar{y}(\lambda).\ d\lambda$$

-continued $$Z = k * \int_{380}^{780} T(\lambda)*I(\lambda)*\bar{z}(\lambda).\ d\lambda$$

where $k=1/N$ and $N=\int_\lambda \bar{y}(\lambda)*I(\lambda)\cdot d\lambda$ or, where (b)

$$X = k * \sum_i Ti*Ii*\bar{x}i(\lambda).\ \Delta\lambda$$

$$Y = k * \sum_i Ti*Ii*\bar{y}i(\lambda).\ \Delta\lambda$$

$$Z = k * \sum_i Ti*Ii*\bar{z}(\lambda).\ \Delta\lambda$$

where $k=1/N$ and $N=\Sigma_i\bar{y}i*Ii\cdot\Delta\lambda$ with (a and b)

$$A_{metamer}(\lambda) = \sum_i Ai(\lambda)$$

$$A_{metamer} = -\log10(T_{metamer})$$

Ai being the absorbance of ink (or pigment) I, following the BeerLambert law.

The spectral transmissions of a lens are preferably measured directly through all the layers of the lens. Hence, hard-coat layer, antireflective layer or mirror layer are considered in order that the combination with the different dyes on different lenses or part of lenses produces the same color appearance of the lens.

The solution of the equation provides metameric spectra and preferably the concentration of each dye that composes the formulation of the coloration of the lens.

Ideally, the solution of the equation, for the chosen standard observer and illuminant, produces results matching:

$|(XTS1-X\text{metamer})/XTS1|\leq15\%$, more preferably <5%

$|(YTS1-Y\text{metamer})/YTS1|\leq15\%$, more preferably <5%

$|(ZTS1-Z\text{metamer})/ZTS1|\leq15\%$, more preferably <5% or $|(xTS1-X\text{metamer})/xTS1|\leq5\%$, more preferably <2%

$|(yTS1-Y\text{metamer})/yTS1|\leq5\%$, more preferably <2%

The equation can be calculated within a different color space than CIE-XYZ color space. For instance, the same principle can be applied to LMS coordinates instead of XYZ. For CIE-Lab color space, $\Delta E^*$ can be calculated and will ideally be inferior or equal to 6, preferably inferior or equal to 2.

Figure 2:
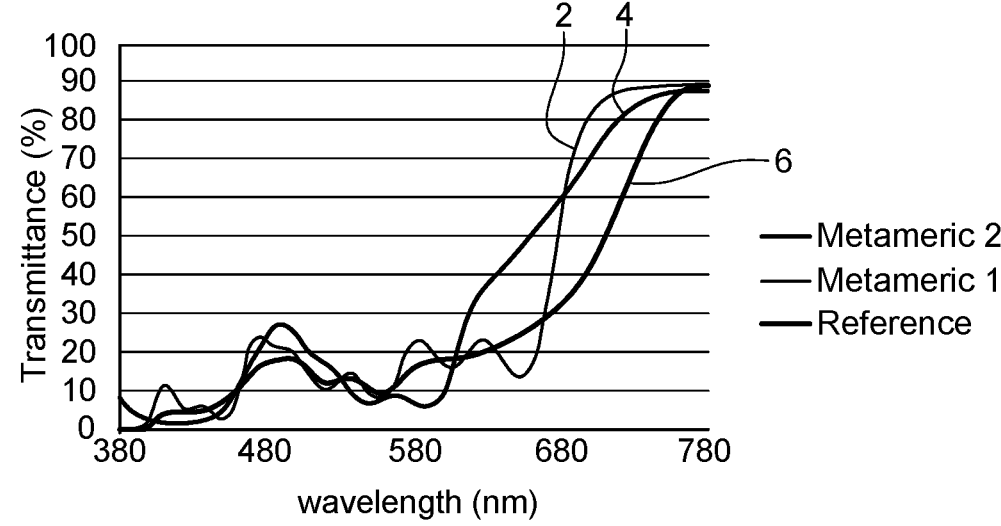

Metameric transmission spectra are preferably determined so that they have a transmission spectrum different from a first transmission spectrum of a first filter but having substantially the same chromatic coordinates of the first transmission spectrum in a same color space. By "substantially the same" chromatic coordinates, we mean that:
In the CIE-XYZ Color Space:

$|(XTS1-X\text{metamer})/XTS1| \leq 15\%$, more preferably $<5\%$ $|(YTS1-Y\text{metamer})/YTS1| \leq 15\%$, more preferably $<5\%$ $|(ZTS1-Z\text{metamer})/ZTS1| \leq 15\%$, more preferably $<5\%$ or $|(xTS1-X\text{metamer})/xTS1| \leq 5\%$, more preferably $<2\%$ $|(yTS1-Y\text{metamer})/yTS1| \leq 5\%$, more preferably $<2\%$ In the CIE-Lab Color Space:
$\Delta E^* \leq 6$, more preferably $\leq 2$ FIGS. 2 and 3 show respectively a table and a graph illustrating an example of results obtained when solving the above-mentioned equations. Particularly, a first 2 and a second 4 transmission spectra are determined and compared to a reference transmission spectrum 6.

A way of solving these equations is to use Cohen and Kappauff method (1982) and the principle of metameric black. A matrix represents the chromaticity curves (r, g, b) and are combined to $\overline{x}$, $\overline{y}$, $\overline{z}$ and spectral transmission of different color that could compose the lens. With the constraints of having all concentration between 0 and 100%, the solution of the equation allows to obtain the right combination for a metameric curve.

To ensure the color consistency of the skin through the lenses (seen by others), the calculation of the metameric lens may take into account the color of the skin of the wearer. To do so, the illuminant in the equations may be replaced by the combination of the illuminant and the reflectance of the skin. The same calculation may be done for the color of the iris of the wearer.

In the provided method, a first filter is then determined 300 based on said first transmission spectrum or based on a first metameric transmission spectrum selected from the metameric transmission spectra. In other words, this first filter may be based directly on the first transmission spectrum or on a metamer thereof.

Said first metameric transmission spectrum is selected from the metameric transmission spectra depending on the constraints described above which are notably related to the wearer, the manufacturing process and preferences of the wearer.

A second filter is then determined 400 based on a second metameric transmission spectrum selected from the metameric transmission spectra.

To take into account the color of the skin, a color of a portion of the skin of the wearer is first determined. The second metameric transmission spectrum is then selected such that said color of a portion of the skin of the wearer through the second metameric transmission spectrum is substantially the same as the color of the skin of the wearer through the first metameric transmission spectrum when said first filter is based on said first metameric transmission spectrum. Alternatively, said second metameric transmission spectrum is selected such that said color of a portion of the skin of the wearer through the second metameric transmission spectrum is substantially the same as the color of the skin of the wearer through the first transmission spectrum when said first filter is based on said first transmission spectrum.

Figure 4:
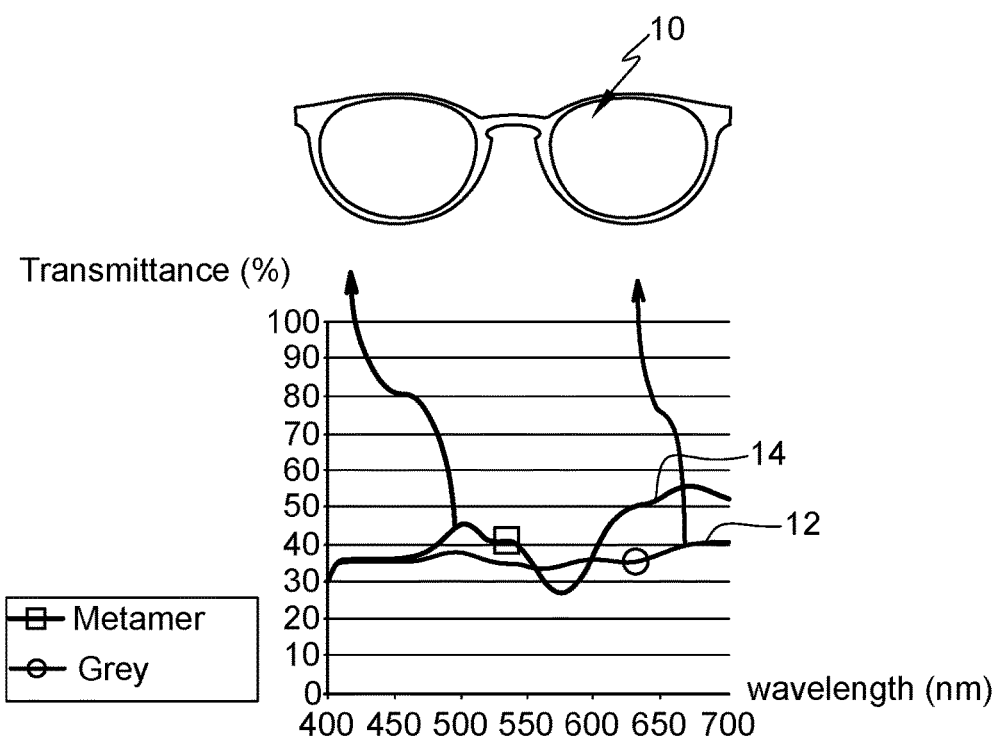
FIG. 4 is a graph showing the difference of spectral transmission between a grey lens and a metameric grey lens determined by the abovementioned method.
Figure 5:
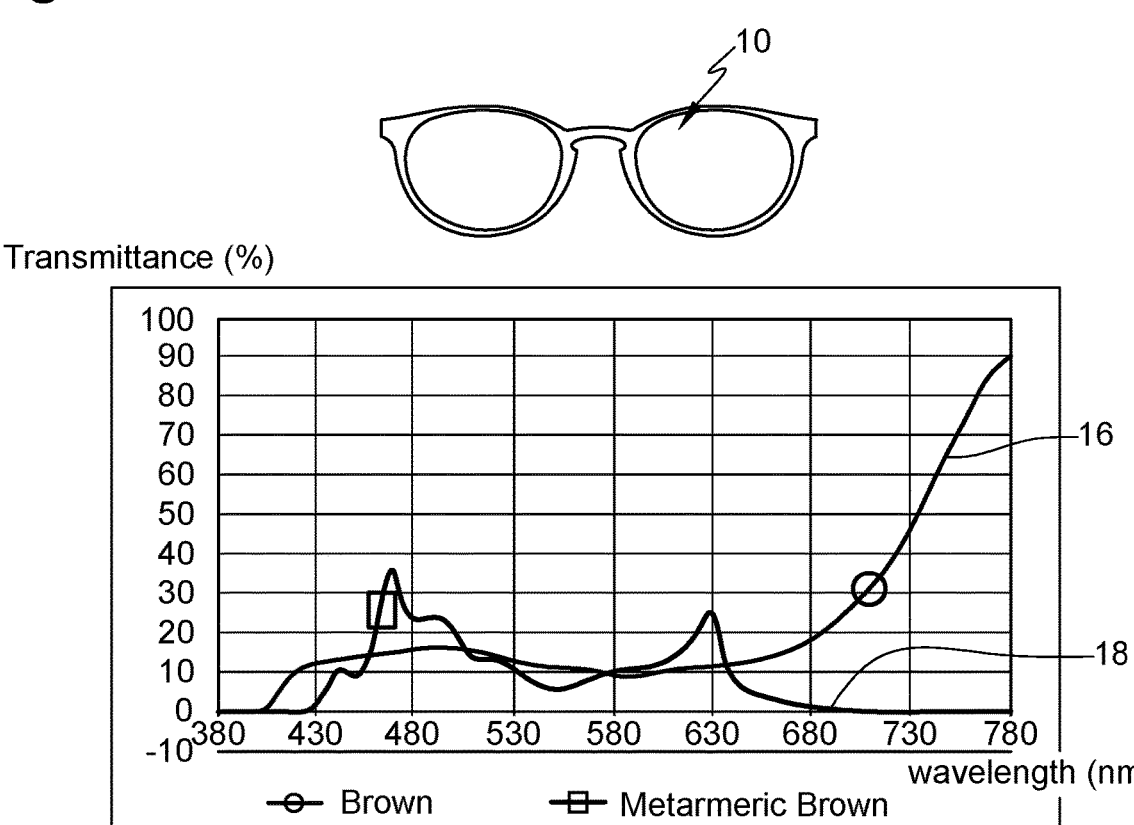
FIG. 5 is a graph showing the difference of spectral transmission between a brown lens and a metameric brown lens determined by the abovementioned method.
Figure 6:
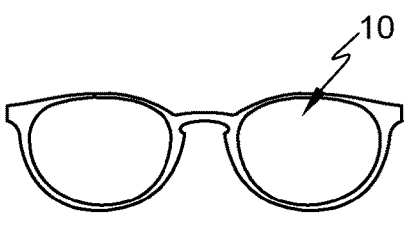
FIG. 6 is a graph showing the difference of spectral transmission between a grey-green lens and a metameric grey-green lens determined by the abovementioned method.
Figure 6:
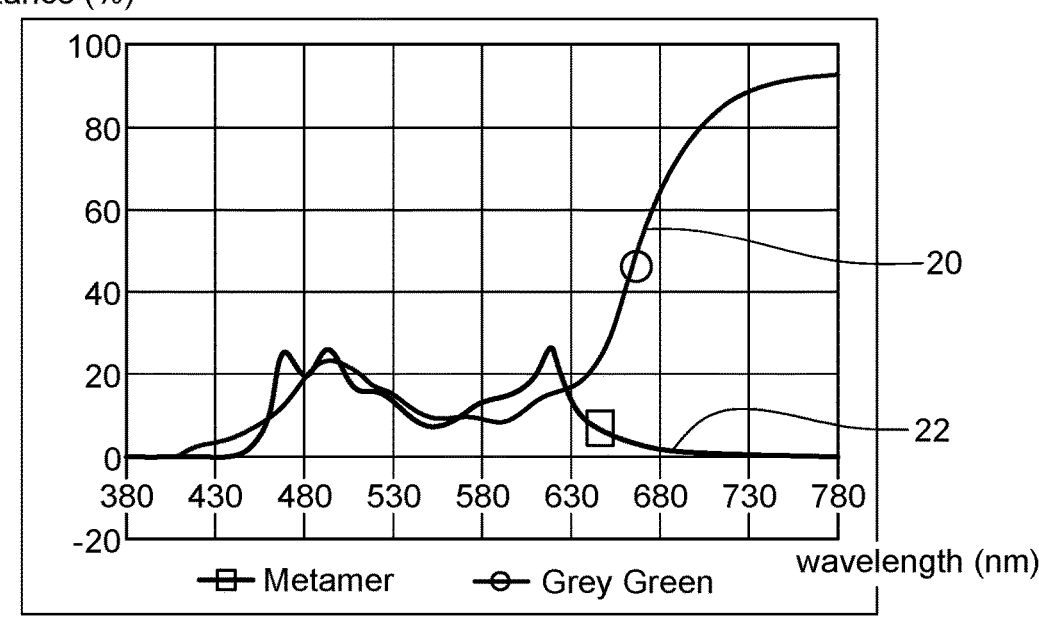

FIGS. 4 to 6 respectively show spectral transmissions (T %) of metameric binocular grey, brown and grey-green lenses of a visual equipment 10 which can be obtained using the method described above. The spectral transmission of these metameric grey, brown and grey-green lenses are respectively compared to grey, brown and grey-green lenses to see the different spectral transmission while having the same color appearance.

We can see on FIG. 4 that a first curve 12 of a grey lens defines a spectral transmission between 30 and 40% in the visible spectrum whereas a second curve 14 of a metameric grey lens defines a spectral transmission between 25 and 55% in the same visible spectrum. Particularly, we can see that the first curve 12 uniformly increases between 400 and 700 nm whereas the second curve 14 increases to 45% at 500 nm, then decreases down to 25% at 575 nm and finally increases to 55% at 675 nm.

We can see on FIG. 5 that a third curve 16 of a brown lens defines a spectral transmission between 0 and 90% in the visible spectrum whereas a fourth curve 18 of a metameric brown lens defines a spectral transmission between 0 and 35% in the same visible spectrum. Particularly, we can see that the third curve 16 increases between 380 and 420 nm, is then relatively monotonic between 420 nm and 680 nm and then greatly increases to 90% at 780 nm. At the contrary, the fourth curve 18 increases to 35% at 460 nm, then decreases down to 5% at 550 nm and finally decreases to 0% with a peak of 25% at 630 nm.

We can see on FIG. 6 that a fifth curve 20 of a grey-green lens defines a spectral transmission between 0 and 90% in the visible spectrum whereas a sixth curve 22 of a metameric grey-green lens defines a spectral transmission between 0 and 25% in the same visible spectrum. Particularly, we can see that the fifth curve 20 increases between 380 and 500 nm, decreases between 500 nm and 650 nm and then greatly increases to 90% to 780 nm. At the contrary, the sixth curve 22 increases to 25% at 480 nm, then decreases down to 0% at 780 nm with a peak of 25% at 600 nm.

The invention further provides an article or visual equipment comprising at least one ophthalmic lens intended to be placed in front of at least one eye of a wearer. Said article further comprises a first filter and a second filter determined according to the method described above.

Figure 7:
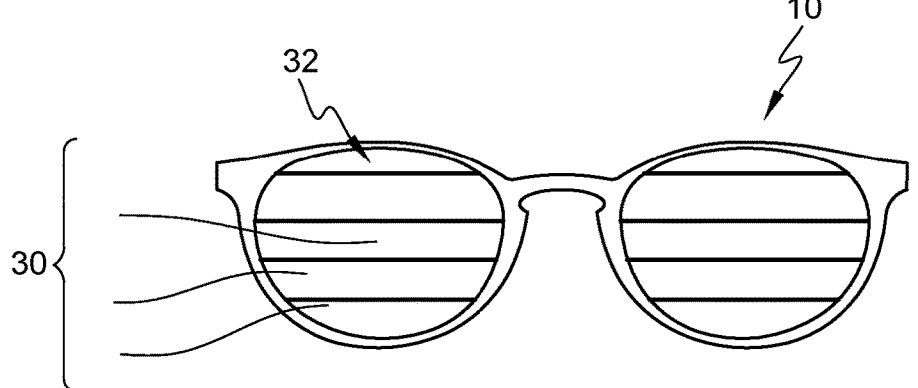
FIG. 7 shows an embodiment of a visual equipment comprising lenses with a metameric linear gradient.

In a geometrical configuration, said at least one ophthalmic lens comprises said first and said second filters respectively provided to a first and to a second portions of said at least one ophthalmic lens. As respectively shown on FIGS. 7 and 6, said first and said second filters may provide a linear or concentric gradient of spectral transmission. In these embodiments, areas 30 of the lenses 32 have different spectral transmissions, at least one area 30 being a metameric spectral transmission of one another.

For myopia control (for contact lenses), the concentric metamerism allows to produce different spectra over the surface of a lens and produce hyperopic defocus or myopic defocus according to the amount of shorter wavelengths versus longer wavelengths.

Figure 8:
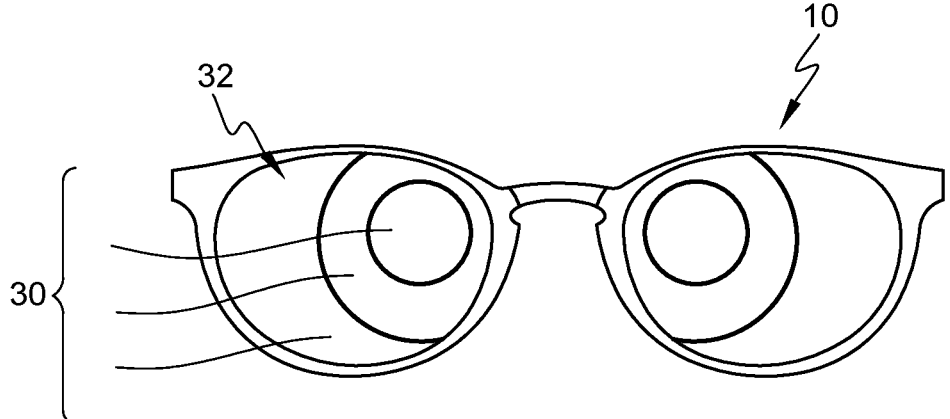
FIG. 8 shows an embodiment of a visual equipment comprising lenses with a metameric concentric gradient.

This concentric gradient is preferably centered around near visual point as shown on FIG. 8. In the linear gradient, the gradient may vary from near to distance visual point.

In a binocular configuration, said article comprises a first ophthalmic lens having said first filter and a second ophthalmic lens having said second filter.

According to an alternative embodiment, the binocular and geometrical configurations may be combined. As an example, said article may comprises metameric right and left lenses with one of the right and left lenses having metameric filters.

Furthermore, the temporal configuration may also be combined to one or both of the geometrical and binocular configurations. As an example, said article may comprise a lens with metameric portions, at least one of these metameric portions being configured to be selectively activated.

In a particular embodiment, the method according to the invention is computer-implemented. Namely, a computer program product comprises one or more sequences of instructions that are accessible to a processor and that, when executed by the processor, cause the processor to carry out steps of the method for determining first and second filters as described above.

The sequence(s) of instructions may be stored in one or several computer-readable storage medium/media, including a predetermined location in a cloud.

Although representative methods and devices have been described in detail herein, those skilled in the art will recognize that various substitutions and modifications may be made without departing from the scope of what is described and defined by the appended claims.

In doing so, the invention may comprise a computer system for determining said first and second filters, the system comprising:

a processor; and
a memory with computer code instructions stored thereon, the memory operatively coupled to the processor such that, when executed by the processor, the computer code instructions cause the computer system to perform the above-described method.

The invention may also comprise a computer program product comprising code instructions for performing a method for determining said first and second filters according to the above-described method.

The invention claimed is:

1. A method for determining a first filter intended to be placed in front of an eye of a wearer and a second filter, different from the first filter, intended to be placed in front of an eye of a wearer, said first and second filters being intended to be positioned in a non-superposed configuration, the method comprising the following steps:

providing a first transmission spectrum;
determining metameric transmission spectra of said first transmission spectrum;
determining said first filter based on said first transmission spectrum or based on a first metameric transmission spectrum selected from the metameric transmission spectra of said first transmission spectrum; and
determining said second filter based on a second metameric transmission spectrum selected from the metameric transmission spectra of said first transmission spectrum, wherein said first transmission spectrum and said metameric transmission spectra of said first transmission spectrum provide a continuous transmission which does not have transmission peaks leading the transmission to drop to 0% for one or more wavelength ranges between 450 and 650 nm.

2. The method according to claim 1, wherein the step of determining said metameric transmission spectra comprises the steps of:

determining the chromatic coordinates of the first transmission spectrum in a color space; and determining transmission spectra different from the first transmission spectrum having substantially the same chromatic coordinates in the same color space.

3. The method according to claim 2, wherein the color space takes into account the human visual system and is the CIE-XYZ space or CIEL*a*b space.

4. The method according to claim 1, wherein the first filter is intended to be placed in front of a first eye of the wearer and the second filter is intended to be placed in front of a second eye of the wearer, different from the first eye.

5. The method according to claim 1, wherein the first filter is intended to be placed at a first area in front of an eye of the wearer and the second filter is intended to be placed at a second area in front of said eye, said first area being different from said second area.

6. The method according to claim 1, wherein the step of determining said second filter comprises:

determining a color of a portion of the skin of the wearer,
selecting the second metameric transmission spectrum such that said color of a portion of the skin of the wearer through the second metameric transmission spectrum is substantially the same as the color of the skin of the wearer through:
the first metameric transmission spectrum when said first filter is based on said first metameric transmission spectrum or
through the first transmission spectrum when said first filter is based on said first transmission spectrum.

7. The method according to claim 1, wherein the step of determining said second filter comprises:

determining a color of an iris of the wearer,
selecting the second metameric transmission spectrum such that said color of the iris of the wearer through the second metameric transmission spectrum is substantially the same as the color of the iris of the wearer through:
the first metameric transmission spectrum when said first filter is based on said first metameric transmission spectrum or
through the first transmission spectrum when said first filter is based on said first transmission spectrum.

8. An article comprising at least one ophthalmic lens intended to be placed in front of at least one eye of a wearer, said article further comprising a first filter and a second filter determined according to claim 1.

9. The article according to claim 8, wherein said at least one ophthalmic lens comprises said first and said second filters respectively provided to a first and to a second portions of said at least one ophthalmic lens.

10. The article according to claim 9, wherein said first and said second filters provides a linear or concentric gradient of spectral transmission.

11. The article according to claim 8, wherein said at least one ophthalmic lens comprises said first and said second filters, said at least one ophthalmic lens being configured to activate either said first or said second filter.

12. The article according to claim 8, comprising a first ophthalmic lens having said first filter and a second ophthalmic lens having said second filter.

13. A method of improving color vision for a wearer, comprising:

obtaining an article comprising at least one ophthalmic lens intended to be placed in front of at least one eye of a wearer, said article further comprising a first filter and a second filter determined according to claim 1; and
using the article to improve color vision of the wearer.

14. The method of claim 13, wherein the wearer is further defined as a colorblind wearer.

\* \* \* \* \*